(12) United States Patent
Kriser

(10) Patent No.: US 9,328,520 B1
(45) Date of Patent: May 3, 2016

(54) HIGH STRENGTH IN-FLOOR DECOUPLING MEMBRANE

(71) Applicant: Matthew Kriser, Sugar Hill, GA (US)

(72) Inventor: Matthew Kriser, Sugar Hill, GA (US)

( * ) Notice: Subject to any disclaimer, the term of this patent is extended or adjusted under 35 U.S.C. 154(b) by 0 days.

(21) Appl. No.: 14/802,387

(22) Filed: Jul. 17, 2015

(51) Int. Cl.
| | |
|---|---|
| *E04F 13/08* | (2006.01) |
| *E04F 15/02* | (2006.01) |
| *B32B 3/30* | (2006.01) |
| *E04F 15/08* | (2006.01) |
| *F24D 3/14* | (2006.01) |
| *F24D 3/16* | (2006.01) |
| *E04F 15/18* | (2006.01) |

(52) U.S. Cl.
CPC ............... *E04F 15/082* (2013.01); *F24D 3/14* (2013.01); *F24D 3/16* (2013.01); *B32B 3/30* (2013.01); *E04F 15/18* (2013.01); *E04F 2290/023* (2013.01)

(58) Field of Classification Search
CPC ....... E04F 15/18; E04F 15/182; E04F 15/185; E04F 15/186; E04F 15/02; B32B 3/30
USPC ................. 52/173.1, 384–386, 388, 220.2, 52/390–391
See application file for complete search history.

(56) References Cited

U.S. PATENT DOCUMENTS

| | | | | |
|---|---|---|---|---|
| 4,640,854 | A * | 2/1987 | Radtke ................ | E04F 15/02 428/138 |
| 4,890,433 | A * | 1/1990 | Funaki ................ | E04F 13/0801 52/385 |
| 4,917,933 | A * | 4/1990 | Schluter .............. | E04B 1/762 428/107 |
| 5,042,569 | A * | 8/1991 | Siegmund ............ | F24D 3/143 165/49 |
| 5,763,039 | A * | 6/1998 | Staubs ................ | B32B 3/30 15/215 |
| 5,822,937 | A * | 10/1998 | Mahony .............. | E04F 13/0801 52/366 |
| 5,927,033 | A * | 7/1999 | Kreckl ................ | E04F 13/0883 156/310 |
| 6,434,901 | B1 | 8/2002 | Schluter | |
| 7,536,835 | B2 * | 5/2009 | Schluter .............. | E04F 15/08 52/302.1 |
| 7,617,647 | B2 * | 11/2009 | Turner et al. ....... | E04F 15/02183 52/385 |
| D654,600 | S * | 2/2012 | Devine ................ | D25/138 |
| 8,176,694 | B2 | 5/2012 | Batori | |
| 8,640,403 | B2 * | 2/2014 | Masanek, Jr. ....... | E04F 15/105 428/139 |
| 2001/0037533 | A1 * | 11/2001 | Doyle ................. | E01D 19/125 14/73 |
| 2005/0193669 | A1 * | 9/2005 | Jenkins ............... | E01C 5/20 52/392 |
| 2006/0201092 | A1 * | 9/2006 | Saathoff .............. | E04F 13/00 52/385 |
| 2008/0086958 | A1 * | 4/2008 | Schroer ............... | E02D 31/02 52/169.14 |
| 2009/0026192 | A1 * | 1/2009 | Fuhrman ............. | H05B 3/06 219/523 |
| 2011/0185658 | A1 * | 8/2011 | Cerny ................. | E04F 15/10 52/302.1 |
| 2011/0232217 | A1 * | 9/2011 | Hartl .................. | E04F 15/18 52/309.1 |
| 2012/0031026 | A1 * | 2/2012 | Chen .................. | E04F 15/02405 52/220.2 |
| 2012/0055108 | A1 * | 3/2012 | Bierwirth ............ | E04F 15/182 52/403.1 |
| 2013/0011609 | A1 * | 1/2013 | Comitale ............. | E04F 15/182 428/141 |
| 2013/0095295 | A1 * | 4/2013 | Masanek, Jr. ....... | E01C 5/226 428/161 |
| 2014/0069039 | A1 | 3/2014 | Schluter et al. | |
| 2014/0283468 | A1 * | 9/2014 | Weitzer .............. | E04F 11/108 52/177 |

* cited by examiner

*Primary Examiner* — Joshua J Michener
*Assistant Examiner* — Kyle Walraed-Sullivan
(74) *Attorney, Agent, or Firm* — Thompson Patent Law; Craige Thompson

(57) ABSTRACT

Apparatus and associated methods relate to a flexible membrane defining pathways for receiving a flexible conduit, and further defining attachment regions between the pathways formed with overhanging walls. In an illustrative example, the membrane may be vacuum-formed plastic sheet material. In some embodiments the flexible conduits may conduct electricity or heat transfer fluids, for example. In various implementations, the overhanging walls in the attachment regions may advantageously provide improved vertical attachment strength to a rigid planar substrate placed over a mortar filled into the attachment regions.

16 Claims, 8 Drawing Sheets

HIGH STRENGTH IN-FLOOR DECOUPLING MEMBRANE

TECHNICAL FIELD

Various embodiments relate generally to high strength in-floor decoupling membranes.

BACKGROUND

Rigid floor coverings such as tile require a sturdy and stable base for longevity. Because wood structures expand and contract with changes in humidity—and it is inherently flexible, wood it is not ideal for tile floors that are intended to have an appreciable lifespan. Many of today's building are constructed using an engineered wood particle board such as oriented strand board (OSB). Tile and thinset mortar producers belonging to the Tile Council of North America do not recommend installing ceramic tile directly to OSB or over other single-layer plywood floor systems. The ANSI standards for tile installation (A108) require subfloor rigidity that can only be provided by a layer of cement board or a membrane component. The primary method for stiffening wood floors used today is to screw sections of ½" thick cement board to the subfloor and patch the seams with thinset mortar.

Concrete subfloors possess the required rigidity to support tile flooring but have other problems including lateral forces caused by shifting, settling, or fracturing concrete. As such, the Tile Council of North America recommends bonding a crack isolation/anti-fracture membrane to the concrete subfloor prior to installing tile. The tile is then bonded with an adhesive mortar such as thinset mortar to the top surface of the membrane. The membrane acts to prevent movement in the concrete from being directly transferred to the tile flooring. Typically, membranes are vacuum-formed high density polyethylene plastic with an anchoring fleece laminated to the bottom surface.

SUMMARY

Apparatus and associated methods relate to a flexible membrane defining pathways for receiving a flexible conduit, and further defining attachment regions between the pathways formed with overhanging walls. In an illustrative example, the membrane may be vacuum-formed plastic sheet material. In some embodiments the flexible conduits may conduct electricity or heat transfer fluids, for example. In various implementations, the overhanging walls in the attachment regions may advantageously provide improved vertical attachment strength to a rigid planar substrate placed over a mortar filled into the attachment regions.

Various embodiments may achieve one or more advantages. For example, some embodiments may provide a low profile, which may substantially reduce risk of tripping hazard at a transition boundary between tile and carpet. Some embodiments may provide much higher strength connection to the tile on top of the membrane via thin set mortar, while still providing decoupling between the floor and motion in the sub-floor. Stronger adhesion strength between the decoupling membrane and the tile above it may provide enhanced stiffness sufficient to meet code requirements, in some implementations. Some embodiments may yield reduced profile flooring, for example, by eliminating the need for cement board layer in order to satisfy stiffness requirements, such as when the membrane provides both decoupling and in-floor heat transfer conduits, for example.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
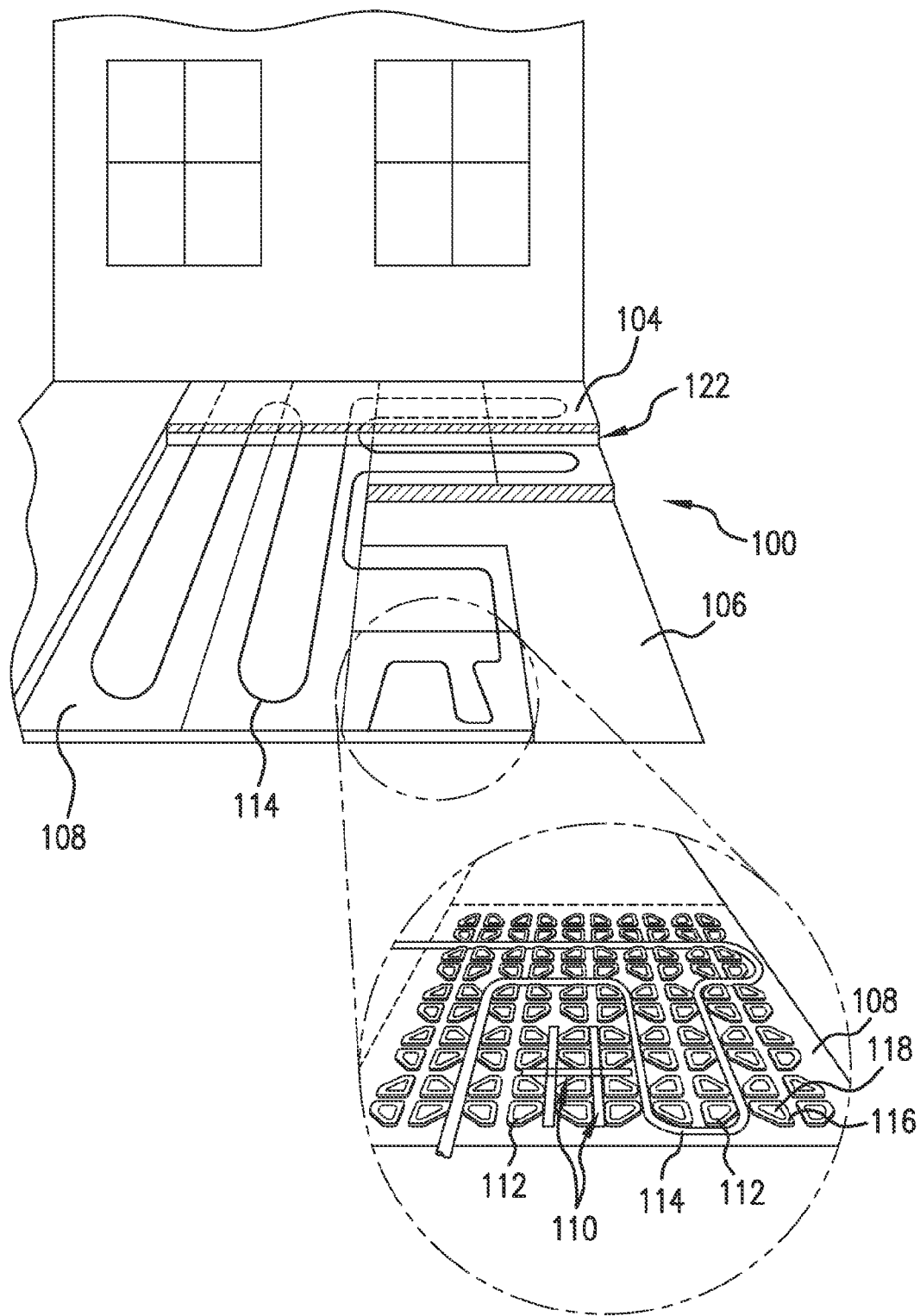
FIG. 1 is a perspective view of an exemplary embodiment of a high strength underlayment apparatus in a partially completed tile flooring installation.

FIG. 1 illustrates an exemplary embodiment of a high-strength veneer underlayment apparatus 100 in a partially completed tile flooring installation. The underlayment apparatus 100 provides support and isolation for a rigid veneer floor covering, for example, ceramic, porcelain, or stone tiles 104, installed over a flexible or shifting subfloor 106. The underlayment apparatus 100 includes an isolation membrane 108 having a bridging structure formed by intersecting channels 110 and hollow support pedestals 112. The channels 110 are formed to receive and hold in place an elongate tubular conduit such as a radiant heating element 114. The support pedestals 112 provide isolation between the tiles 104 and the subfloor 106 and have a generally triangular cross sectional shape with a flat upper surface 116. An attachment reservoir 118 formed with a dovetail-shaped side wall 120 (FIG. 2B) is provided within the upper surface 116 of the support pedestals 112. In the illustrated tile flooring installation, an adhesive bonding agent, such as thinset mortar 122, is layered over the isolation membrane 108, filling the channels 110 and attachment reservoirs 118. Tiles 104 are laid over the isolation membrane 108 and the mortar 122 is allowed to set. After setting, the mortar 122 hardened within the grid of channels 110 acts to increase the rigidity and strength of the isolation membrane 108. Hardened plugs of mortar 122 within each of the attachment reservoirs 118 are held in place against the side walls 120 and act to increase the mechanical bond between the entire layer of mortar 122 and the isolation membrane 108. The rigidity, bonding, and isolation provided by the underlayment apparatus 100 eliminates the need for additional support, such as with a layer of cement board. This may advantageously reduce the height of the top surface of the installed tile 104 to reduce or eliminate a trip hazard at transitions between carpeting and tiles 104.

Figure 2A:
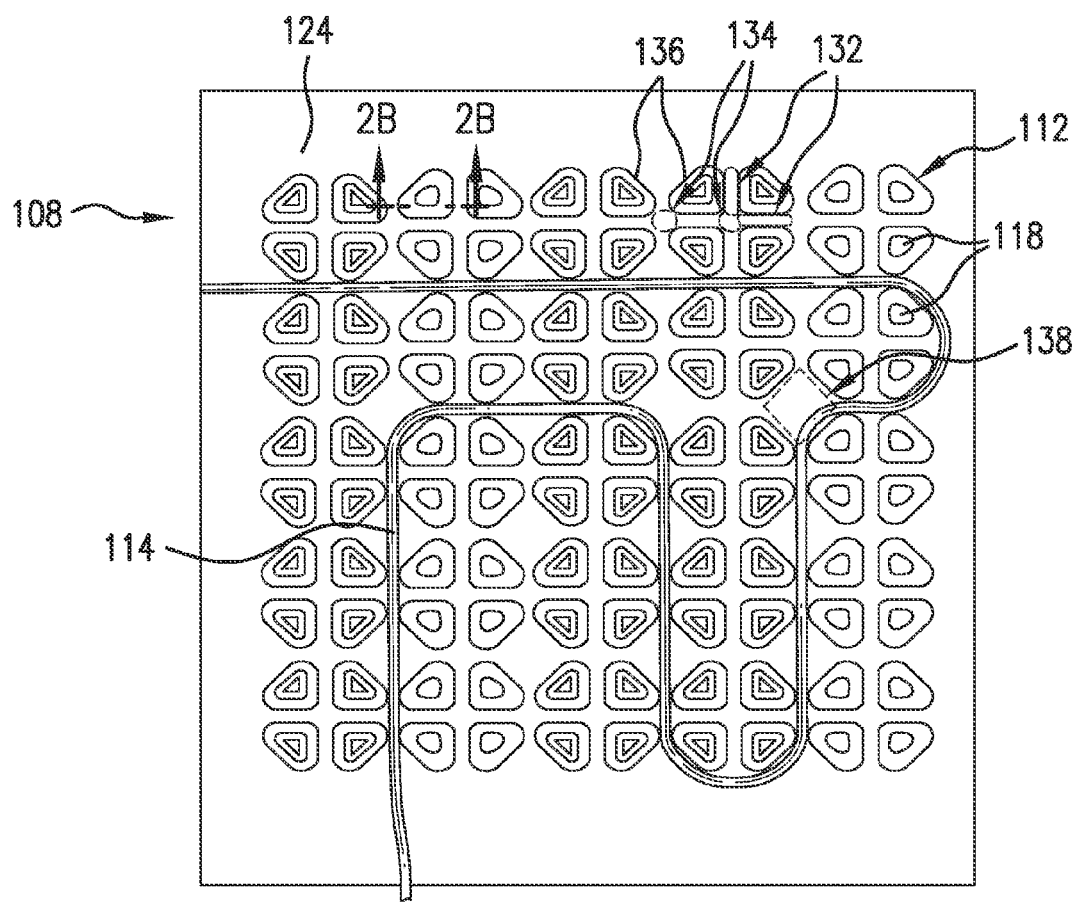
FIG. 2A depicts a top plan view of a section of an isolation membrane of the underlayment apparatus of FIG. 1.
Figure 2B:
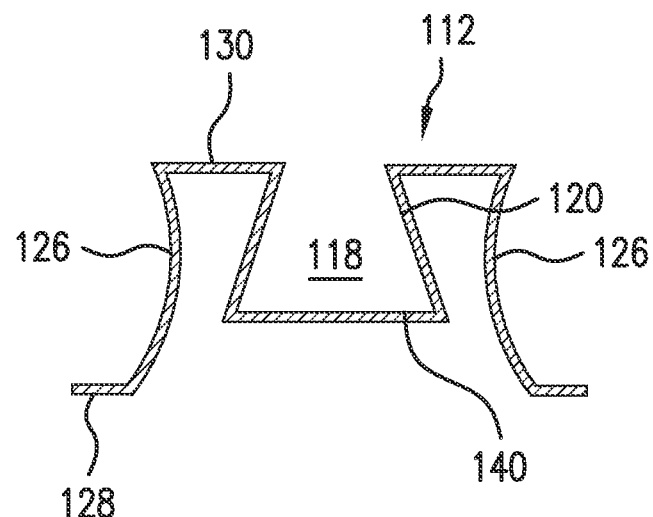
FIG. 2B depicts an enlarged sectional view of a support pedestal of the isolation membrane of FIG. 2A, taken along line 2B-2B.

FIG. 2A depicts a top plan view of a square-shaped section 124 of the isolation membrane 108 of FIG. 1. The isolation membrane 108 may be molded into uniform sections 124 from a high density polyethylene material in a vacuum forming process. FIG. 2B depicts an enlarged sectional side view of one support pedestal 112 of the isolation membrane 108. The support pedestal 112 is defined by an exterior wall 126 vertically extending between a base 128 disposed within a bottom plane and the generally flat upper surface 130 lying within a top plane. The pedestals 112 are uniformly spaced apart forming a grid having straight segments 132 of channels 110 extending between multiple intersections 134. The channels 110 have an open top and lie within a common plane disposed between the top plane and bottom plane. The exterior walls 126 of the pedestals 112 may be formed with a concave shape such that a periphery of the upper surface 130 overhangs, and further defines, the generally rounded channels 110.

The exterior wall 126 extends between three adjacent intersections 134 to give the support pedestal 112 a generally triangular profile with an angled face 136. Support pedestals 112 are positioned in a back-to-back arrangement such that the angled face 136 of one support pedestal 112 is adjacent to least one other angled face 136, creating a series of larger intersections 138. The area in the larger intersections 138 is sufficient to accommodate a change in direction, or bend, in the heating element 114 within the common plane.

Attachment reservoirs 118 are formed in the upper surface 116 of the support pedestal 112 with a dovetail-shaped side wall 120 and a flat bottom surface 140. The side wall 120 is angled such that the top of the reservoir 118 has a perimeter less than a perimeter at the bottom surface 140. The reservoir 118 is open such that thin-set mortar 122 applied to the isolation membrane 108 also enters and fills the reservoirs 118. After setting, the mortar 122 inside of the reservoir 118 forms a plug locked in place against the side wall 120. The plugs of mortar provide increased mechanical bonding by anchoring the layer of mortar 122 to the isolation membrane 108.

Figure 2C:
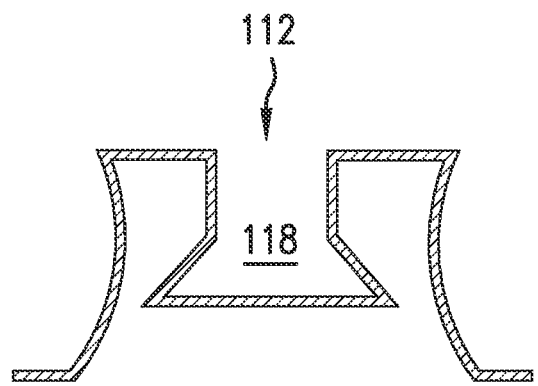
FIGS. 2C-2E depict enlarged sectional views of alternate embodiments of attachment reservoirs of the support pedestals of FIG. 2A.
Figure 2D:
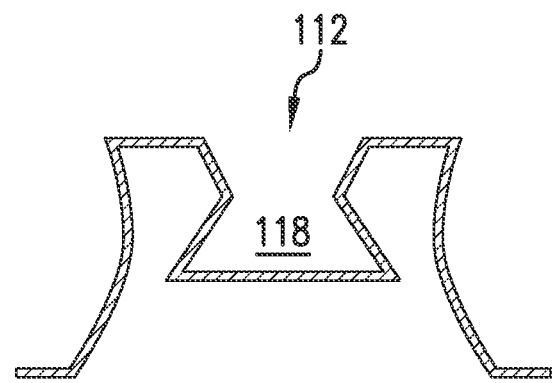
Figure 2E:
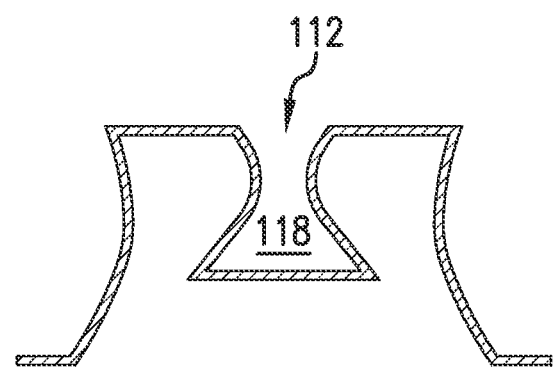

FIGS. 2C-2E depict enlarged sectional side views of alternate embodiments of attachment reservoirs 118 of the support pedestals of FIG. 2A. The embodiments provide various levels of mechanical bonding between the isolation membrane 108 and mortar 122. Each reservoir 118 has a portion where a perimeter of the side wall 120 closer to the top is smaller than a perimeter of the side wall 120 closer to the bottom surface 140 to create a locking plug of mortar 122.

The radiant heating element 114 in the illustrated example is a continuous length of heating cable, fully received within the channels 110. The heating element 114 is routed through a series of straight segments 122 in a determined manner or as dictated by applicable building code regulations. The larger intersections 138 are sized to accommodate the bending radius of heating element 114. The channels 110 may also be sized to provide a friction fit between the heating element 114 and the exterior wall 126 of the support pedestals 112 to hold the heating element 114 in place prior to the application of the mortar 122 and tiles 104. Other means to hold the heating element 114 in place within the channels 110 are discussed in greater detail with reference to FIGS. 4A, 4B, and 5.

Figure 3:
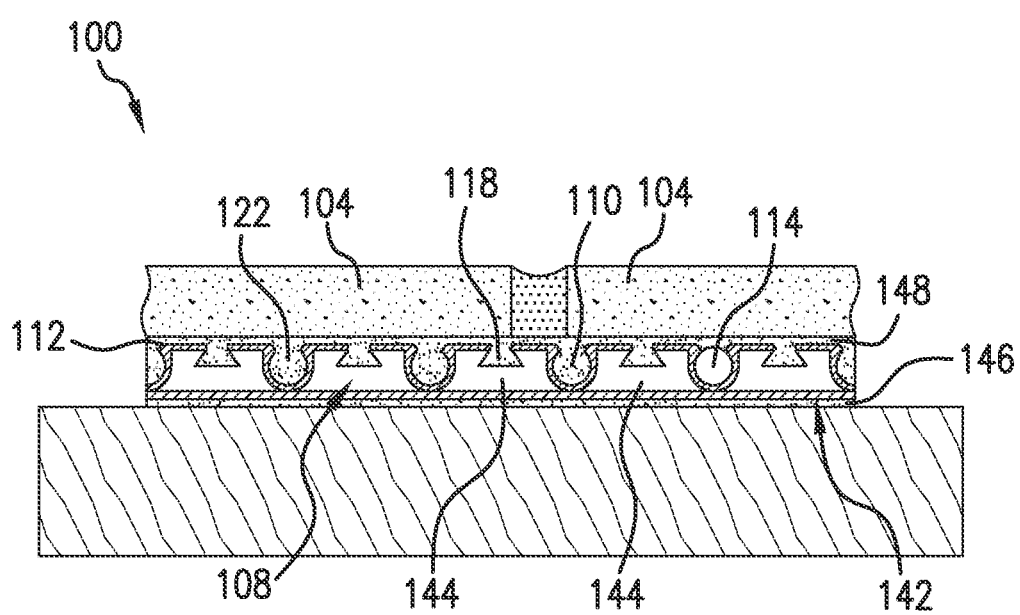
FIG. 3 depicts a sectional view of the tile flooring and underlayment apparatus of FIG. 1, taken along line 3-3.

FIG. 3 depicts an enlarged sectional view of the tiles 104 and underlayment apparatus 100 of FIG. 1. The apparatus 100 includes a thin layer of fleece fabric 142 melted and bonded to the bottom of the isolation membrane 108, creating a hollow space 144 within each support pedestal 112. The isolation membrane 108 is bonded to the subfloor with a first layer of thinset mortar 146. Heating element 114 extends through one of the channels 110. The tiles 104 are bonded to the isolation membrane 108 with a second layer of thinset mortar 148. As shown, channels 110 without the heating element 114 and all of the attachment reservoirs 118 are filled with mortar 122 from the second layer 148. The channel 110 with the heating element 114 also has a layer hardened mortar 122 to prevent vertical displacement of the heating element 114.

The hatch grid of hardened mortar 122 formed within the intersecting channels 110 provides sufficient stiffness to the underlayment apparatus 100 to meet subfloor rigidity standards set by ANSI and the Tile Counsel of North America. Accordingly, tiles 104 may be installed using the underlayment apparatus 100 without an additional support layer such as cement, or backer-, board (or 'backer board'). This may advantageously lower the height profile of the installed tile 104 to reduce or eliminate a trip hazard at a transition between carpeting and the tiles 104. The flexible nature of the isolation membrane provided by the hollow spaces 144 absorbs forces and movement created when the subfloor 106 shifts, expands, or cracks without transferring the force to the tile floor 104.

Figure 4A:
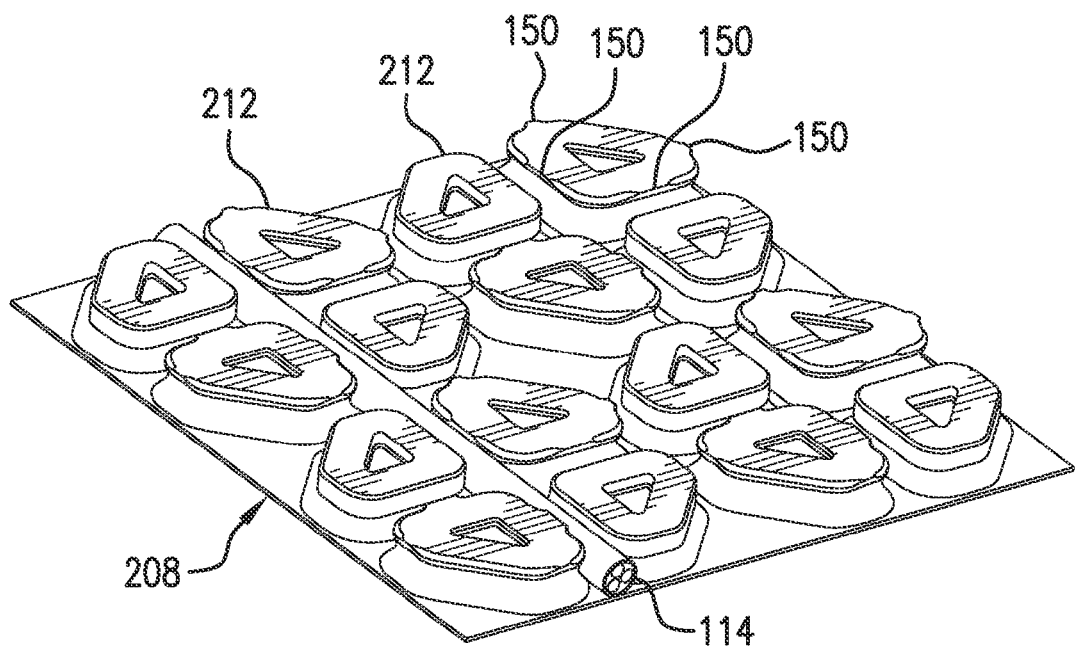
FIG. 4A depicts a perspective view of a portion of a second exemplary embodiment of an isolation membrane of the underlayment apparatus of FIG. 1.
Figure 4B:
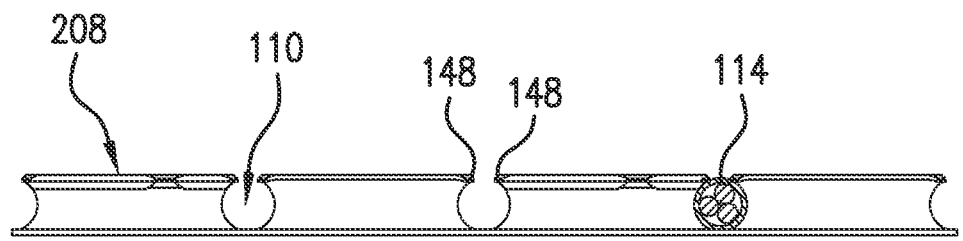
FIG. 4B depicts a side elevational view of the portion of the isolation membrane of FIG. 4A.
Figure 5:
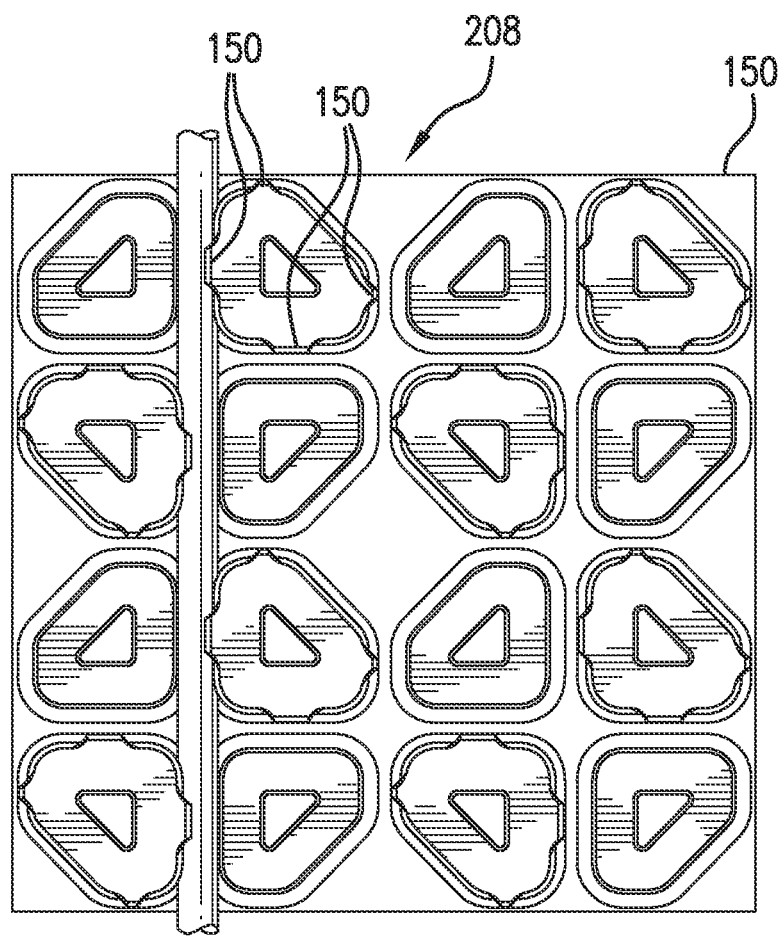
FIG. 5 depicts a top plan view of the portion of the isolation membrane of FIG. 4A.

FIG. 4A depicts a portion of a second exemplary embodiment of an isolation membrane 208 of the underlayment apparatus 100 of FIG. 1. FIG. 4B depicts a side view and FIG. 5 depicts a top view of the portion of the isolation membrane 208 of FIG. 4A. In this example, a portion of the support pedestals 212 include four integral tabs 150 extending from the periphery of the upper surface 116 into the channels 110. The tabs 150 may be flexible such that they are temporarily deformed when the heating element 114 is pressed into the channels 110. The tabs 150 may also be rigid such that the heating element 114 is partially temporarily deformed when pressed into the channels 110. Once in the channels 100, the heating element 114 is held within the common plane with the tabs 150 prior to being covered and secured within the mortar 122. In the illustrated example, support pedestals 212 with tabs 150 are positioned back-to-back with support pedestals 112 having no tabs 150 such that the tabs 150 are spaced apart on alternating sides of the channel 110. Alternating tabs 150 between multiple support pedestals 112 may advantageously provide adequate retention for the heating element 114 while requiring less force needed to insert or remove the heating element 114 from the channels 110.

Figure 6:
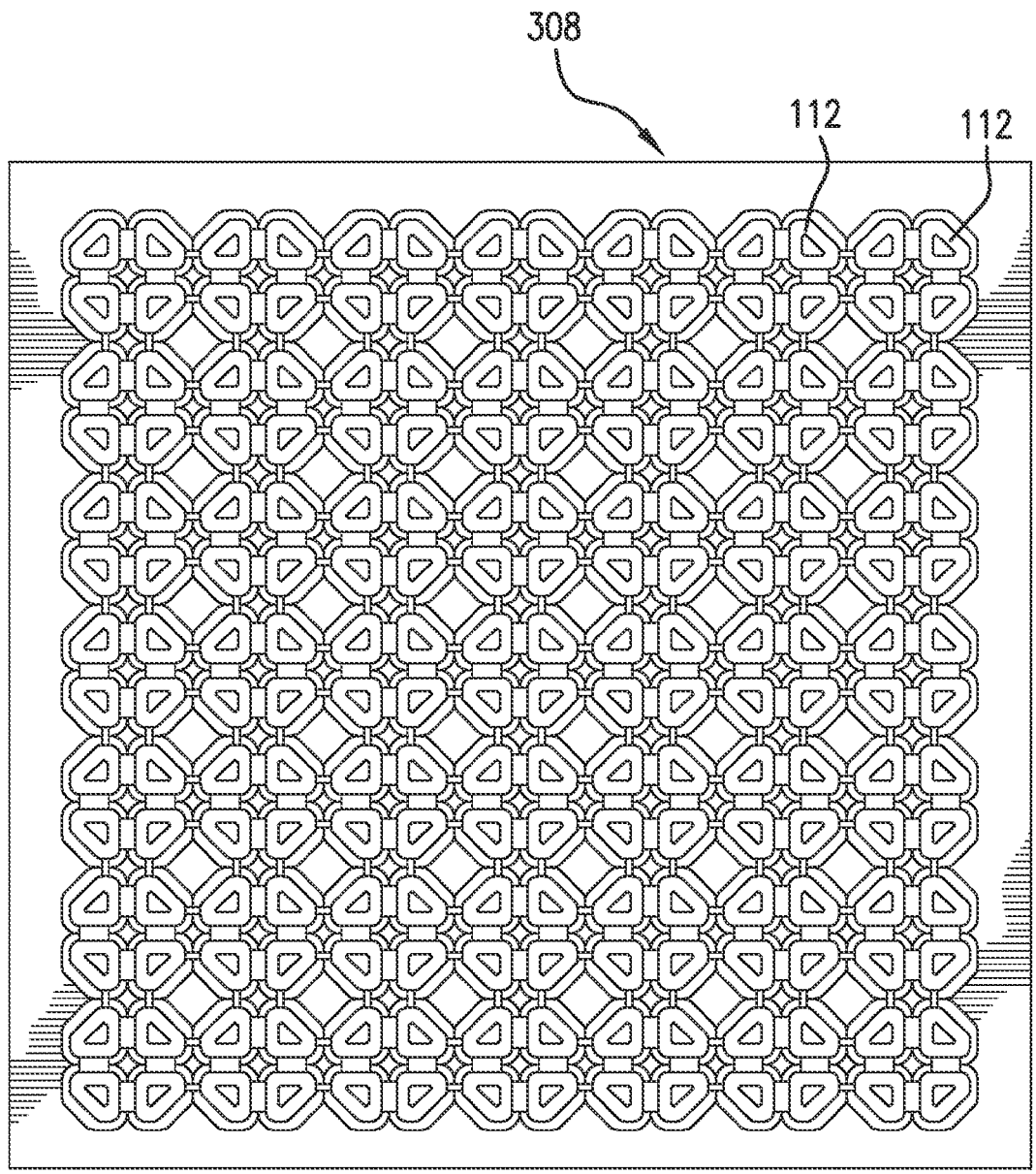
FIG. 6 depicts a top plan view of a third exemplary embodiment of an isolation membrane of an underlayment apparatus of FIG. 1.

FIG. 6 depicts a top plan view of a third exemplary embodiment of an isolation membrane 308 of an underlayment apparatus of FIG. 1. The isolation membrane 308 is shown as a large pre-formed section with a grid of support pedestals 112. As shown in FIG. 1, multiple sections of the membrane 308 are placed side-by-side and are be trimmed to size as required.

Although various embodiments have been described with reference to the Figures, other embodiments are possible. For example, the support pedestals 112 and attachment reservoirs 118 may have various geometrical forms as called for by the requirements of a specific application. The isolation membrane 108 may be formed from a number of different materials in a number of different methods including injection molding. The isolation membrane 108 may be formed as a planar sheet of varying sizes and widths. The area formed by the support pedestals and fleece fabric layer may be filled with a shock-absorbing materials such as a gel or flexible foam. In some embodiments, the support pedestals 112 may be pre-configured in unique arrangements or may even be provided separately so as to be individually positioned and secured with an adhesive at the installation site.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A strengthened underlayment apparatus to support and isolate a rigid veneer floor covering from a flexible, moveable, or shiftable sub-floor, the strengthened underlayment apparatus comprising:
    an isolation membrane defining: a plurality of channels lying in a common plane between a top plane and a bottom plane, the plurality of channels being shaped to receive an elongate tubular conduit, the plurality of channels forming a network of straight segments that interconnect between a plurality of intersections in which the elongate tubular conduit lying in some of the straight segments may change direction without leaving the common plane; and,
    a plurality of support pedestals each comprising an exterior wall that extends toward the top plane, each of the support pedestals forming a generally triangular shape in the common plane, each of the support pedestals further defining an attachment reservoir having an interior wall and a bottom wall forming the attachment reservoir, wherein the interior wall of each of the attachment reservoirs is formed with a dovetail feature such that, in a plane parallel to the common plane, the perimeter of the interior wall is greater at a first height between the bottom plane and the top plane than the perimeter of the interior wall at a second height between the bottom plane and the top plane,
    wherein the second height is closer to the top plane than the first height,
    wherein each attachment reservoir extends part way between the bottom plane and the top plane.

2. The strengthened underlayment apparatus of claim 1, wherein the plurality of support pedestals are further defined by a generally flat upper surface extending parallel to the top plane between the exterior wall; wherein a plurality of exterior walls are shaped such that a periphery of the upper surface of the plurality of support pedestals overhangs the channels.

3. The strengthened underlayment apparatus of claim 2, wherein the shaped exterior walls have a concave profile.

4. The strengthened underlayment apparatus of claim 3, wherein the isolation membrane is vacuum-formed from a moldable material into a sheet having a square perimeter.

5. The strengthened underlayment apparatus of claim 4, further comprising: a piece of fabric; wherein the fabric is fused to the isolation membrane within the bottom plane to create a surface to be bonded to the sub-floor.

6. The strengthened underlayment apparatus of claim 5, wherein the fabric is fleece and wherein each support pedestal includes a hollow air space defined by an interior surface and the fleece fabric.

7. The strengthened underlayment apparatus of claim 4, further comprising: an adhesive mortar, wherein when layered over the isolation membrane, the adhesive mortar is fully received within each of the plurality of channels and attachment reservoirs forming a continuous layer of mortar covering the isolation membrane.

8. The strengthened underlayment apparatus of claim 1, further comprising the elongate tubular conduit; wherein a radiant heating element is disposed within the elongate tubular conduit.

9. The strengthened apparatus of claim 8, wherein the radiant heating element is one of a heat-transfer fluid and heat-trace wiring.

10. The strengthened underlayment apparatus of claim 1, wherein a plurality of the attachment reservoirs are formed in a triangular shape having three vertices on an outer perimeter.

11. The strengthened underlayment apparatus of claim 1, wherein a plurality of vertices of the plurality of support pedestals are formed to be smoothly rounded with a radius of curvature large enough to accommodate a bend in the elongate tubular conduit.

12. An underlayment apparatus for a supporting and isolating a rigid veneer floor covering from a flexible, movable, or shifting subfloor, the underlayment apparatus comprising:
    a plurality of support pedestals each comprising an exterior wall that extends toward a top plane each of the plurality of support pedestals forming a generally triangular shape in a common plane, each of the plurality of support pedestals further defining an attachment reservoir having an interior wall and a bottom wall forming the attachment reservoir, wherein the interior wall of each of the attachment reservoirs is formed with a dovetail feature such that, in a plane parallel to the common plane, the perimeter of the interior wall is greater at a first height between the bottom plane and the top plane than the perimeter of the interior wall at a second height between the bottom plane and the top plane, wherein the second height is closer to the top plane than the first height,
    wherein each attachment reservoir extends part way between the bottom plane and the top plane;
    means for supporting a rigid veneer floor covering above the subfloor;
    means for isolating the rigid veneer floor covering from movement of the subfloor; and
    means for positioning a tubular radiant heating element between the rigid veneer floor covering and the subfloor.

13. The underlayment apparatus of claim 12, wherein the supporting means provide additional stiffness such that the need for an additional support layer is eliminated.

14. The underlayment apparatus of claim 13, wherein further comprising:
    means to adhesively bond the supporting means to the rigid veneer floor covering; and
    means to mechanically bond the adhesively bonding means to the support means.

15. The underlayment apparatus of claim 12, wherein each of the pedestals is formed in a group of four pedestals, and in each of the groups of four pedestals, the four pedestals are uniformly spaced apart to define straight segments of the plurality of channels orthogonally arranged so as to form a T-intersection.

16. The underlayment apparatus of claim 1, wherein each of the pedestals is formed in a group of four pedestals, and in each of the groups of four pedestals, the four pedestals are uniformly spaced apart to define straight segments of the plurality of channels orthogonally arranged so as to form a T-intersection.

* * * * *